May 12, 1970   F. SCHWARZER   3,512,174
THERMO-SENSITIVE RECORDER
Filed Nov. 6, 1968

INVENTOR.
FRITZ SCHWARZER
BY Noble S. Williams
ATTORNEY

United States Patent Office 3,512,174
Patented May 12, 1970

3,512,174
THERMO-SENSITIVE RECORDER
Fritz Schwarzer, 38 Barmannstrasse, 8000
Munich 60, Germany
Filed Nov. 6, 1968, Ser. No. 773,722
Int. Cl. G01d 15/10
U.S. Cl. 346—76                    2 Claims

ABSTRACT OF THE DISCLOSURE

A heated ridge for an inkless recorder of the type in which a galvanometer recorder arm applies pressure to recording media directed over the ridge. The recording media becomes sensitive to pressure upon being heated by the ridge for recording a trace of points of pressure applied thereto by the recorder arm. The ridge comprises a thin straight electrically heated wire seated within a strip of heat-insulating material with a substantial portion of its circumferential surface exposed as the apex of the ridge for receiving the recording media. A rigid supporting member holds the wire and its insulating material adjacent to the recorder arm.

BRIEF SUMMARY OF THE INVENTION

The invention refers to an inkless recorder in which a galvanometer pointer arm effects a heat supply to a temperature sensitive strip-shaped recording chart respectively to a temperature sensitive printing strip guided above the recording chart, which chart and strip are passed near a recording ridge.

Known heated stylus inkless recorders are subject to the deficiency that, at higher recording speeds, i.e. at comparatively quick deflections of the controlled galvanometer pointer arm, the pointer arm dwells on each line element only for a very short period of time such that a hardly visible record results. The zero line on the contrary, because of long dwelling times of the pointer arm at zero deflection, appears as a comparatively thick record trace. The object of the invention is an inkless recorder of the above-specified type, in which the width of the recorded trace is almost independent of the velocity of the movement of the pointer arm.

An inkless recorder of the above-specified type is characterized in that the recording ridge comprises an electrically heated metal wire, and in that the recording chart in extended form respectively the printing strip are passed in such a distance from the recording ridge that a thermo-effective record is effected by the control pressure of the non-heated end of the galvanometer pointer arm.

A recorder according to the invention, besides effecting a more uniform width of the recorded traces, has the advantage that the weight of the pointer arm is reduced and thereby the sensitivity of the recorder is increased while at the other side the metal wire disposed in the recording ridge has a sufficiently high heat capacity which is sufficient for activating the temperature sensitive recording chart even when fast deflections of the pointer arm occur. Further it has to be noted that in connection with known heated recorder arms difficulties arise insofar as an additional cooling of the pointer stylus occurs at fast movements of the arm, viz, just when a higher temperature would be desirable, and these difficulties are avoided by the invention.

The U.S. Pat. 2,454,966 discloses an inkless recorder having a heated stylus, wherein not only the fore-end of the pointer arm is heated but also an electrically heated platen is provided, a comparatively sharp rounded edge of which platen serves as recording ridge. The recording chart, in order to be pre-heated, is drawn at an angle over the platen and the recording ridge such that the recording chart always is in good contact with the heated platen. The progressive features of the invention therefore are not obtainable by the said known inkless recorder.

The features of the invention are described in the accompanying drawing in the form of two embodiments.

DETAILED DESCRIPTION

Figure 1:
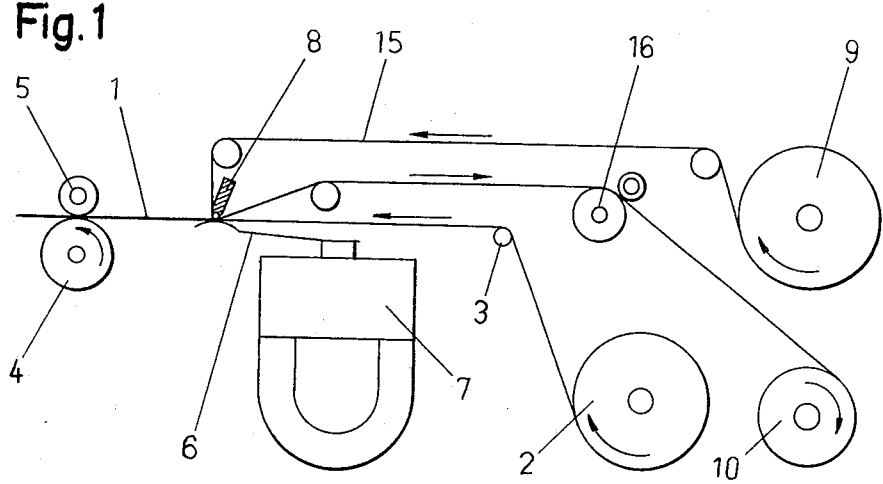
FIG. 1 and FIG. 2 show a first embodiment in which a temperature sensitive printing strip and, guided underneath, the strip-shaped recording chart are passed near the recording ridge.

In the embodiment of FIG. 1 a strip-shaped recording chart consisting of ordinary paper might be used. The recording chart strip 1 is taken off from a supply spool 2 and passed over an idle roll 3 through a driving roll pair 4, 5. The recording arm 6 of the galvanometer 7 forces the strip-shaped recording chart in known manner against the recording ridge 8, which ridge, if a plurality of recording arms is provided, is common to all of said recording arms. A thermo-sensitive printing strip 15 is taken off from the supply spool 9 and is passed around the recording ridge 8 through a pair of driving rolls 16 and is rewound on a re-roll spool 10.

Figure 2:
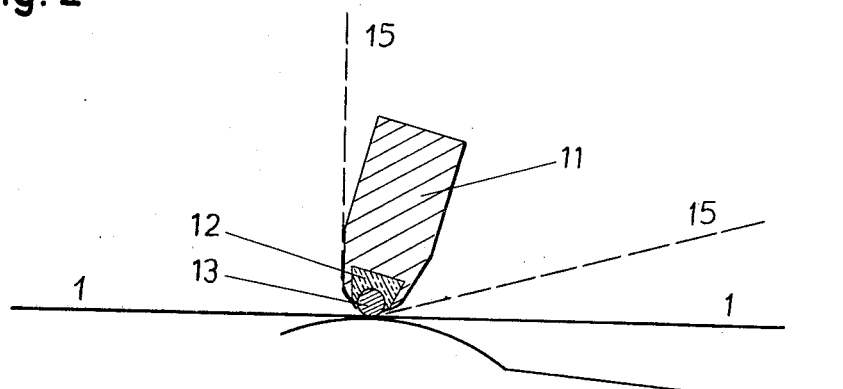

FIG. 2 discloses the recording ridge in greater detail. An electrically heated nickel-chromium wire 13 is supported in a semi-circular groove of an insulating member 12, which member is contained in a groove of an elongated supporting member 11. The nickel-chromium wire is heated by an electrical heating current which is supplied by a controlled source of voltage provided in the apparatus.

Figure 3:
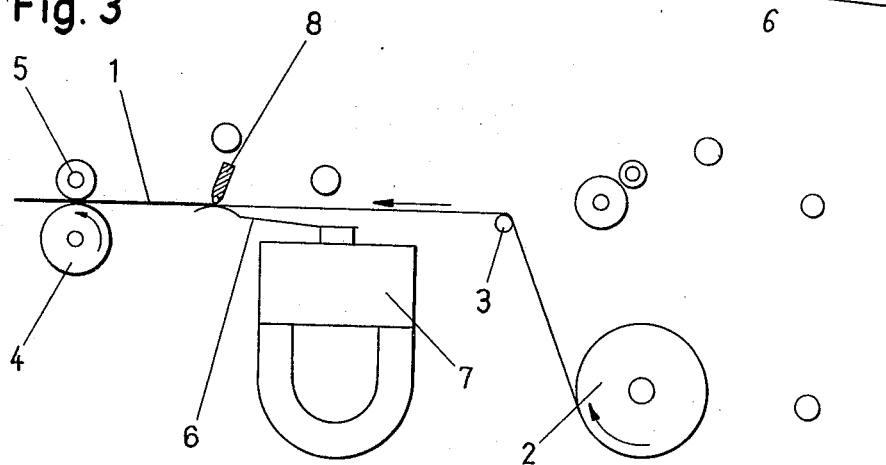
FIG. 3 shows an embodiment in which a temperature sensitive strip-shaped recording chart is used.

The use of an additional temperature sensitive printing strip 15 is not necessary. FIG. 3 discloses an apparatus according to the invention in which the recording chart 1 itself consists of thermo-sensitive paper. It has to be noted that the general arrangement of the apparatus shown in FIG. 3 is identical with the apparatus shown in FIG. 1. It is therefore quite possible to use selectively either an apparatus according to the invention with a strip-shaped recording chart consisting of thermo-sensitive paper and also with a recording chart consisting of ordinary paper in combination with a thermo-sensitive printing strip. If a thermo-sensitive printing strip is used and the degree of heating is properly selected, an additional reduction of the pressure exerted by the recording arm will be possible, because the pigment of the printing strip is almost in liquid state.

What I claim as new and desire to secure by Letters Patent of the United States of America is:

1. The improvement in a heated recording ridge for an inkless recorder of the type in which a galvanometer recorder arm applies pressure to recording media directed over the recording ridge and said media becomes sensitive to pressure upon heating thereof by said ridge for recording a trace of points of pressure applied thereto by said arm; said recording ridge comprising:

a thin straight electrically heated wire across which said recording media is directed;

a strip of heat-insulating material extending along the length of said ridge within which said wire is seated with a substantial circumferential surface portion thereof exposed as the apex of said ridge for receiving said recording media; and means for supporting the combination of said strip of insulating material and wire adjacent to said recording arm.

2. A heated recording ridge according to claim 1 wherein said wire is formed of a nickel-chromium alloy.

References Cited

FOREIGN PATENTS 882,373  11/1961  Great Britain.

JOSEPH W. HARTARY, Primary Examiner